US007240228B2

(12) United States Patent
Bear et al.

(10) Patent No.: US 7,240,228 B2
(45) Date of Patent: Jul. 3, 2007

(54) METHOD AND SYSTEM FOR STANDBY AUXILIARY PROCESSING OF INFORMATION FOR A COMPUTING DEVICE

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Chris Schoppa, Redmond, WA (US); Adrian Chandley, Sammamish, WA (US); William J. Westerinen, Sammamish, WA (US); Dale C. Crosier, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 10/429,930

(22) Filed: May 5, 2003

(65) Prior Publication Data

US 2004/0225901 A1     Nov. 11, 2004

(51) Int. Cl.
*G06F 1/32*     (2006.01)
(52) U.S. Cl. ............. 713/320; 713/324; 345/1.1
(58) Field of Classification Search ............. 713/300, 713/320, 324; 345/1.1
See application file for complete search history.

(56) References Cited

U.S. PATENT DOCUMENTS

| 4,860,342 | A |   | 8/1989 | Danner |
| 5,487,181 | A | * | 1/1996 | Dailey et al. ............ 455/90.2 |
| 5,546,538 | A | * | 8/1996 | Cobbley et al. .......... 709/203 |
| 5,675,810 | A | * | 10/1997 | Sellers ..................... 713/323 |
| 5,768,164 | A | * | 6/1998 | Hollon, Jr. ................ 708/174 |
| 5,802,305 | A | * | 9/1998 | McKaughan et al. ..... 709/227 |
| 6,006,285 | A | * | 12/1999 | Jacobs et al. .............. 710/14 |
| 6,101,610 | A | * | 8/2000 | Beebe et al. .............. 713/323 |
| 6,240,168 | B1 |   | 5/2001 | Stanford et al. |
| 6,266,714 | B1 | * | 7/2001 | Jacobs et al. .............. 710/14 |
| 6,279,056 | B1 | * | 8/2001 | Jacobs et al. .............. 710/48 |
| 6,362,440 | B1 | * | 3/2002 | Karidis et al. ......... 178/18.01 |

(Continued)

FOREIGN PATENT DOCUMENTS

EP         0772327 A2     5/1997

(Continued)

OTHER PUBLICATIONS

Anonymous, International Search Report in Corresponding EP Application No. EP 04 00 9868.

*Primary Examiner*—Chun Cao
(74) *Attorney, Agent, or Firm*—Workman Nydegger

(57) ABSTRACT

A method and system for auxiliary processing of information for a computing device. By simplifying the user managed power states to On and Standby, the computing device preserves its execution context by default when the machine is powered down. As a result, the computing device is made available for use even when it appears to be powered down. The computer hardware and software is capable of responding immediately to network or communication activity, user input, and other events. While the computer is in Standby, it is alert and able to handle background tasks that do not require user interaction. Activities such as answering phone calls, handling voice mail, displaying new e-mail, record voice messages, browsing the Internet, recording TV shows and so forth occur without the user having to turn on the computer.

19 Claims, 10 Drawing Sheets

U.S. PATENT DOCUMENTS

| | | |
|---|---|---|
| 6,513,128 B1 * | 1/2003 | Wang et al. ............... 713/600 |
| 6,518,957 B1 | 2/2003 | Lehtinen et al. |
| 6,603,855 B1 | 8/2003 | Cannon et al. |
| 6,628,267 B2 * | 9/2003 | Karidis et al. ............. 345/168 |
| 6,691,233 B1 * | 2/2004 | Gannage et al. ........... 713/300 |
| 6,806,867 B1 * | 10/2004 | Arruda et al. ............. 345/173 |
| 6,819,961 B2 * | 11/2004 | Jacobs et al. ................ 700/17 |
| 6,882,326 B2 * | 4/2005 | Hirayama et al. ........... 345/1.1 |
| 6,897,851 B2 * | 5/2005 | Carini et al. ............... 345/173 |
| 6,938,174 B2 * | 8/2005 | LeKuch et al. ............. 713/320 |
| 2002/0087225 A1 * | 7/2002 | Howard ....................... 700/94 |

FOREIGN PATENT DOCUMENTS

| | | |
|---|---|---|
| EP | 0777394 A1 | 6/1997 |
| EP | 0838934 A1 | 4/1998 |
| EP | 0772327 A3 | 2/1999 |
| WO | WO9602049 A1 | 1/1996 |

* cited by examiner

METHOD AND SYSTEM FOR STANDBY AUXILIARY PROCESSING OF INFORMATION FOR A COMPUTING DEVICE

CROSS-REFERENCE TO RELATED APPLICATIONS

The present invention is related to the following copending United States Patent Applications filed concurrently herewith, assigned to the assignee of the present invention, and hereby incorporated by reference in their entireties:

"Method and System for Auxiliary Display of Information for a Computing Device," U.S. patent application Ser. No. 10/429,932;

"Real-Time Communications Architecture and Methods for use with a Personal Computer System," U.S. patent appilication Ser. No. 10/429,905;

"Record Button on a Computer System," U.S. patent application Ser. No. 10/429,904;

"System and Method for Activating a Computer System;" U.S. patent application Ser. No. 10/430,369;

"Computer System with Do Not Disturb System and Method," U.S. patent application Ser. No. 10/429,903;

"Computer Camera System and Method for Reducing Parallax." U.S. patent application Ser. No. 10/429,943;

"Control and Communications Panel for a Computer System," U.S. patent application Ser. No. 10/429,933; and "Notification Lights, Locations and Rules for a Computer System," U.S. patent application Ser. No. 10/429,931.

FIELD OF THE INVENTION

The invention relates generally to computer systems, and more particularly to an improved method and system for processing of information for a computing device.

BACKGROUND OF THE INVENTION

Unlike contemporary consumer and business appliances, the personal computer is not always available to process tasks. Boot performance enhancements to speed the time from turning on or resuming the power until the user can begin working have helped to close the gap. However, when not used between tasks, the computer is often shut down and takes a comparably longer time to boot to a ready state than a consumer appliance. Additionally, when the computer has been powered up from a shutdown, the user context is lost. Upon power up, the user can re-establish the user context by launching the applications last used and reopen documents.

Improvements in power management now allow users to store their context by putting the computer into a state of hibernation when turning it off. However, the concepts of power management have grown considerably from a single mechanical isolation switch to a complex system of global, system, processor, performance, and device states that challenges understanding for even the most tech-savvy user. In contrast, the introduction of consumer electronics appliances like personal digital assistants, mobile phones, and set-top boxes do not require users to be educated in power management to operate these appliances which are instantly available.

Further, while the advances in power management have also appreciably extended battery life for mobile computers, there has been little improvement in making computers as instantly available for use as most consumer electronics. What is desirable is a method and system for powering up a computer system almost instantly and making the computer system available for users to access the information they need, where and when they need it.

SUMMARY OF THE INVENTION

Briefly, the present invention provides an improved method and system for auxiliary processing of information for a computing device. When a computer is powered down either manually or automatically, the context of the user session may be preserved so that the user's open documents and application states are not lost. This enhances the user experience, allowing users to continue working exactly where they left off when the computer was turned off.

By simplifying the user managed power states to On and Standby, the computing device preserves its execution context by default when the machine is powered down. As a result, the computing device is made available for use even when it appears to be powered down. The computer hardware and software is capable of responding immediately to network or communication activity, user input, and other events. While the computer is in Standby, it is alert and able to handle background tasks that do not require user interaction. Activities such as answering phone calls, handling voice mail, displaying new e-mail, record voice messages, browsing the Internet, recording TV shows and so forth occur without the user having to turn on the computer.

With the addition of an auxiliary processor and an auxiliary display, the computer is capable of independently handling such activities while it is in the Standby state. Advantageously, the computer may be awakened by the auxiliary processor as needed to handle background tasks that do not require user interaction. The combination of the auxiliary processor and the Standby state transforms the computer to be more available and usable like a consumer appliance.

Other advantages will become apparent from the following detailed description when taken in conjunction with the drawings, in which:

DETAILED DESCRIPTION

Exemplary Operating Environment

Figure 1:
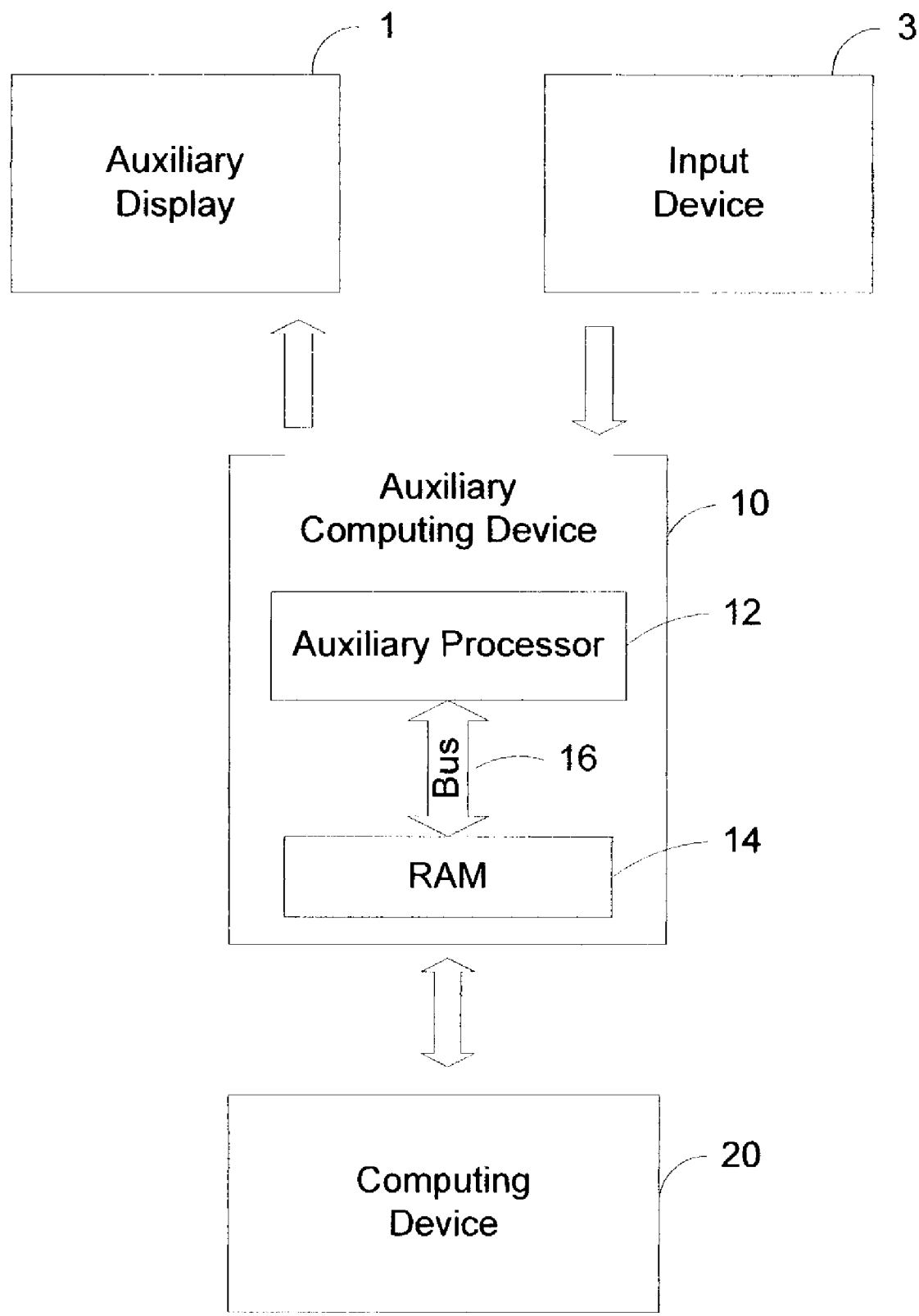
FIG. 1 is a block diagram representing a general architecture of a computing device operative with an auxiliary computing device in accordance with an aspect of the present invention.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. With reference to FIG. 1, an exemplary system for implementing the invention includes an auxiliary display 1 and an input device 3 which are each connected to an auxiliary computing device 10 through a serial interface or by other interfaces, such as a parallel port, game port, infrared or wireless connection, universal serial bus (USB) or other peripheral device connection. The auxiliary display 1 may be in the form of any number of known types of displays such as one or more LEDs, a 2-line alphanumeric display, a monochrome display, or a color display. The auxiliary display 1 may also include a combination of any of the forms described above, such as one or more LEDs used in conjunction with a multi-line display. Those skilled in the art will appreciate that the auxiliary display 1 may be a nonvisual output device such as a set of speakers or a headphone set. An auxiliary display, as referred herein, may be any visual, audible, or tactile representations. Additionally, any of the output devices of the computing device 20 may be used for the auxiliary display 1, or in conjunction with, auxiliary display 1.

Input device 3 may be a single button that allows the user to switch between different applications or categories of functionality such as email notifications, voicemail notifications, calendar notifications, system status notifications, information from Internet subscription services, media information and telephony information. Accompanying the switch button may also be an up button and a down button to allow the user to scroll forward and backward through lists of information within a particular category. Those skilled in the art will appreciate that any other input device may be used such as a keyboard, microphone, joystick, game pad or other device including a device that contains a biometric sensor, environmental sensor, position sensor, or other type of sensor. Additionally, any of the input devices of the computing device 20 may be used for input device 3, or in conjunction with, input device 3.

In accordance with an aspect of the present invention, the auxiliary computing device 10 has an auxiliary processor 12 connected to random-access memory (RAM) 14 by a bus 16. The auxiliary processor 12 may be any type of processing unit including general purpose central processing units. RAM 14 may contain data and loadable program modules such as an operating system, application programs and input/output routines. The data and/or program modules are immediately accessible to and/or presently being operated on by auxiliary processor 12. The bus 16 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The auxiliary computing device 10 is connected to a computing device 20 through a serial interface or by other interfaces, such as a parallel port, game port, infrared or wireless connection, universal serial bus (USB) or other peripheral device connection. The auxiliary computing device 10 may have additional peripheral devices (not shown) including nonvolatile storage devices, such as an optical disk drive. Additionally, the auxiliary computing device 10 may share any peripheral devices of the computing device 20. Moreover, the auxiliary computing device 10 may have a fail-safe battery to operate during periods of power loss.

Those skilled in the art will appreciate that the present invention may also use other computing or communication devices as the auxiliary computing device 10. These other computing or communication devices include general purpose computers, cell phones, handheld devices such as a pager or a personal digital assistant (PDA), and other mobile devices.

Figure 2:
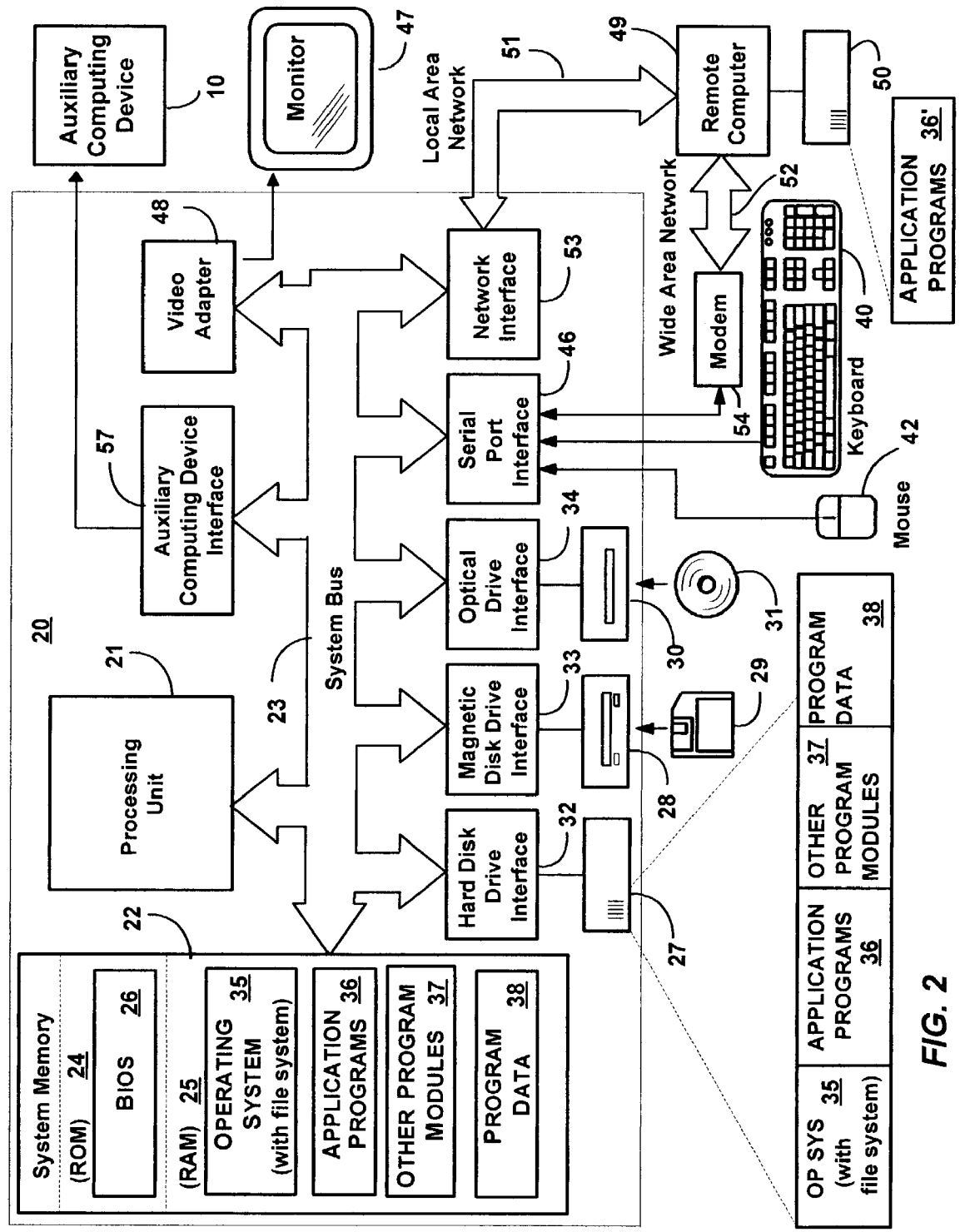
FIG. 2 is a block diagram representing a general purpose computing device in the form of a conventional personal computer system into which the present invention may be incorporated.

FIG. 2 is a block diagram representing the computing device 20 of FIG. 1 in the form of a personal computer system into which the present invention may be incorporated. Those skilled in the art will appreciate that the personal computer system 20 depicted in FIG. 2 is intended to be merely illustrative and that the present invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, headless servers, mainframe computers, distributed computing environments that include any of the above systems or devices, and the like. In a distributed computing environment where tasks are performed by remote processing devices linked through a communications network, program modules may be located in both local and remote memory storage devices.

The components of personal computer system 20 include, but are not limited to, a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The personal computer system 20 typically includes a variety of computer-readable media. Computer-readable media can be any available media that can be accessed by the personal computer system 20 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the personal computer system 20. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. RAM 25 typically contains data and/or program modules that are immediately accessible to and/or presently being operated on by processing unit 21. By way of example, and not limitation, FIG. 2 illustrates operating system 35, application programs 36, other program modules 37 and program data 38. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary computer system described herein employs a hard disk, a removable magnetic disk 29 and a removable optical disk 31, it should be appreciated by those skilled in the art that other types of computer storage media can be used in the exemplary personal computer system 20, such as magnetic cassettes, flash memory cards, digital versatile disks, digital video tape, solid state RAM, solid state ROM and the like.

A number of program modules may be stored on the hard disk, magnetic disk 29, optical disk 31, ROM 24 or RAM 25, including an operating system 35 (such as Windows® XP), one or more application programs 36 (such as Microsoft® Outlook), other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Finally, the auxiliary computing device 10 described in FIG. 1 is connected to the system bus 23 via an auxiliary computing device interface 57 which may be a serial port interface, a parallel port interface, game port interface, an infrared or wireless interface, universal serial bus (USB) or other peripheral device interface.

Figure 3:
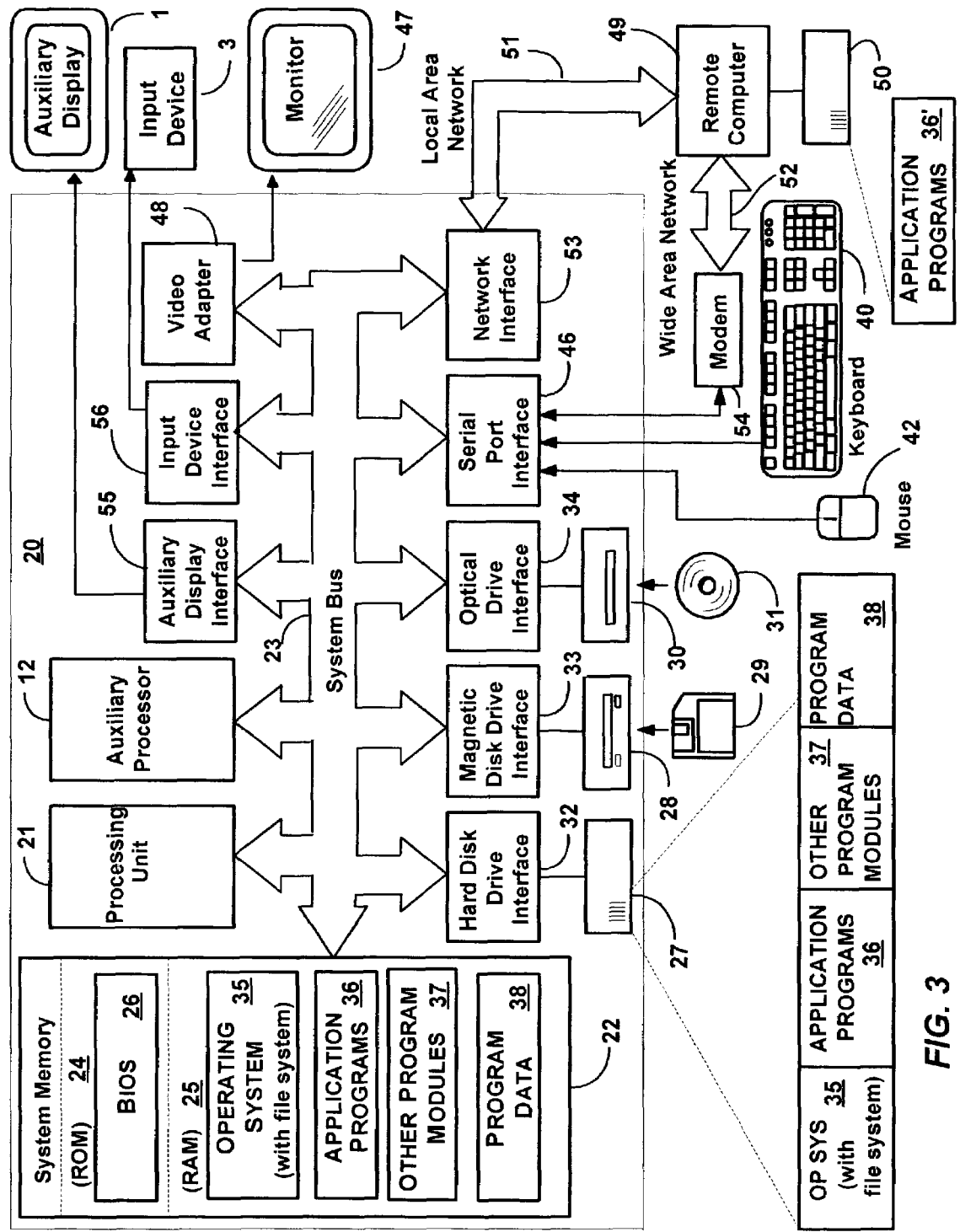
FIG. 3 is a block diagram representing a conventional personal computer system with an integrated auxiliary processor in accordance with an aspect of the present invention.

FIG. 3 is a block diagram representing the computing device 20 of FIG. 2 with an integrated auxiliary processor 12 as an alternate embodiment of the present invention. The auxiliary display 1 described in FIG. 1 is an additional output device connected to the system bus 23 via auxiliary display interface 55, which may be a video adaptor, USB or other peripheral device connection. The input device 3 described in FIG. 1 for controlling the auxiliary display 1 is connected to the system bus 23 via input device interface 56, which may be a serial interface, USB or other peripheral device connection. The auxiliary processor 12 described in FIG. 1 is connected to the system bus 23 and has similar access as processing unit 21 to at least some of the resources of the personal computer 20 including system memory 22. Other components depicted in FIG. 3 are as previously described in FIG. 2. Those skilled in the art will appreciate that the auxiliary processor 12 may also be integrated within other computing and communication devices. Additionally, the present invention may use an auxiliary processor implemented within the processing unit 21 of the computing device 20. For example, an ARM (Advanced RISC Machines) processor may be integrated with a central processing unit as a system-on-chip solution.

Auxiliary Processing of Information

As will be understood, the present invention provides an improved method and system for auxiliary processing of information for a computing device. By simplifying the user managed power states to On and Standby, the computing device preserves its execution context by default when the machine is powered down. As a result, the computing device is made available for use even when it appears to be powered down. The computer hardware and software is capable of responding immediately to network or communication activity, user input, and other events. While the computing device is in Standby, it is alert and able to handle background tasks that do not require user interaction. Activities such as answering phone calls, handling voice mail, displaying new e-mail, record voice messages, browsing the Internet, recording TV shows and so forth occur without the user having to turn on the computer.

With the addition (or leveraging) of an auxiliary processor and/or auxiliary display, the computer is capable of independently handling such activities while it is in the Standby state. Advantageously, the computer may be awakened by the auxiliary processor as needed to handle background tasks that do not require user interaction. The combination of the auxiliary processor and the Standby state transforms the computer to be more available and usable like a consumer appliance.

Figure 4:
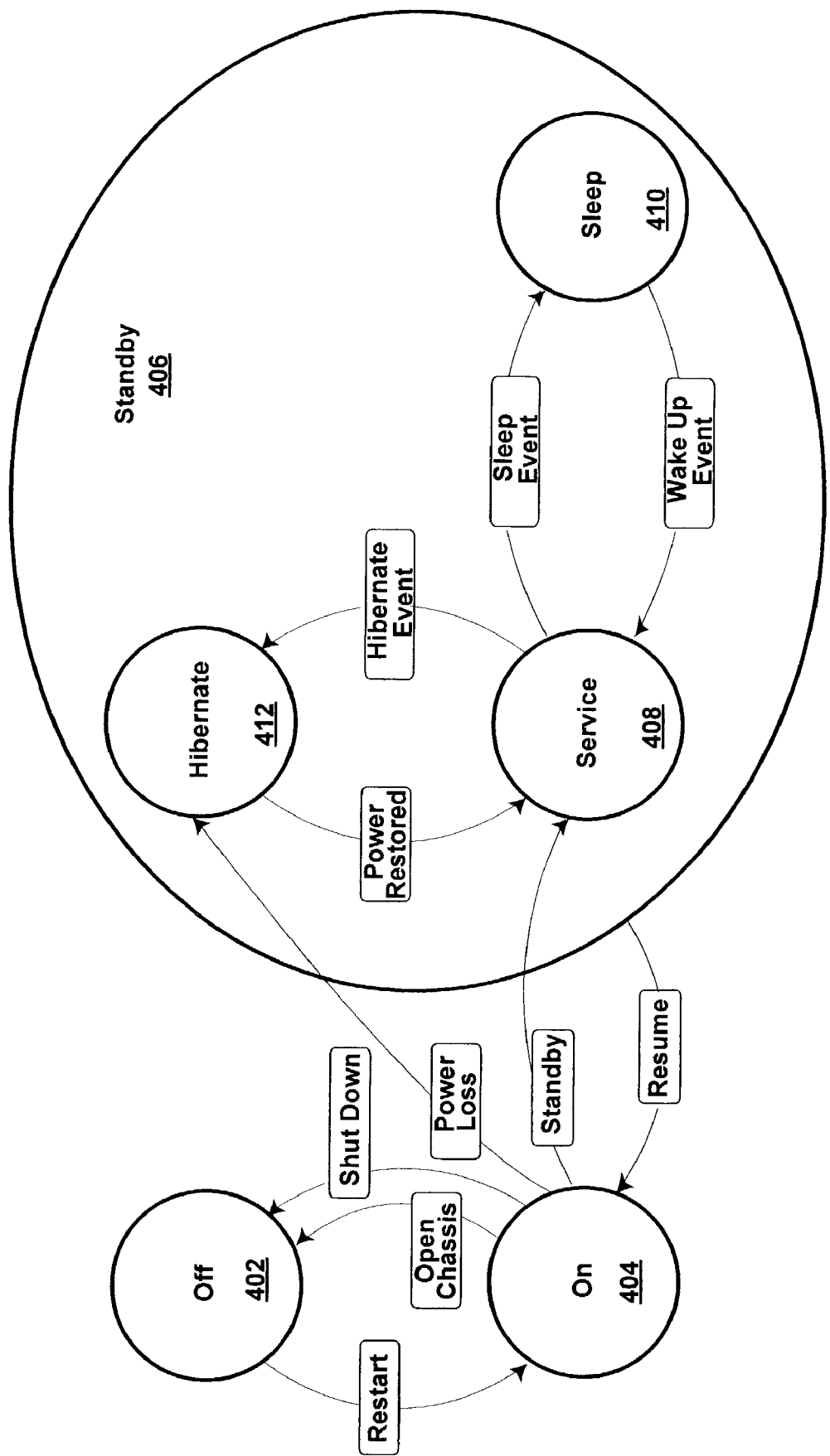
FIG. 4 is a state diagram generally illustrating the power states of a computing device for power management in accordance with an aspect of the present invention.

FIG. 4 presents a state diagram generally illustrating the power states of computing device 20 for power state management of the present invention. More particularly, the state diagram illustrates three main power states for operation of auxiliary processing of information and the actions associated with the transition between the states. There are three main states: Off 402, On 404 and Standby 406. Additionally, Standby 406 has three sub-states: Service 408, Sleep 410 and Hibernate 412. Before computing device 20 is powered on, the system is in Off state 402 with the monitor off and the auxiliary display blank. If a restart event occurs, the system transitions from the Off state 402 to the On state 404. One example of a restart event is when a user presses the power button (with the power supply switch on, if present). This powers up the system and transitions the system to the On state 404 and begins the user session. The system is fully operational in the On state 404 with the monitor and the auxiliary display painted with their respective screens. In this state, the system manages devices and processing unit 21 power states dynamically and is fully interactive with the user.

If a standby event occurs while the system is in the On state 404, the system transitions from the On state 404 to the Standby state 406. For example, a standby event occurs whenever the user signifies the intention to end the user session, such as by pressing the power button while in the On state 404. Alternatively, the user may generate a standby event by turning off the system through the user interface, such as clicking the Turn Off Computer option in the Start menu of the Windows® XP operating system. If computing device 20 is a mobile personal computer, then the user may also generate a standby event by closing the lid of the mobile computer. Yet again, the user session timer may expire due to inactivity for a period of time, and thereby generate a standby event.

When the system transitions from the On state 404 to the Standby state 406, the power management routines of the operating system turn off the main monitor, spin down the hard drives, and shut off the system fans. The auxiliary display remains on for displaying output from auxiliary processing while the computer system is in standby mode.

When the system first enters the Standby state 406, it transitions to the Service sub-state 408 for a predetermined period to process any background tasks pending and advantageously allows the user to quickly transition back from the Standby state 406 to the On state 404 in case the user changes his mind. When the predetermined time expires from user inactivity and there are no background tasks to process, a sleep event is generated and the system transitions from the Service sub-state 408 to the Sleep sub-state 410 within the Standby state 406.

Whenever a wake-up event occurs while the system is in the Sleep sub-state 410, the system transitions from the Sleep sub-state 410 back to the Service sub-state 408 within the Standby state 406. Any incoming communications activity that occurs such as a LAN, modem or USB device activity can be a wake-up event. An application or system service request from the auxiliary processor 12 can also be a wake-up event. As will be appreciated by those skilled in the art, these are illustrative examples of wake-up events and there are other ways of generating a wake-up event such as from operating system timers.

If a hibernate event occurs while the system is in the Service sub-state 408, the system transitions from the Service sub-state 408 to the Hibernate sub-state 412. A hibernate event occurs whenever power is lost, a critical battery alarm occurs for a mobile personal computer, or a hibernate-timer event occurs. The auxiliary display goes blank unless alternately powered such as by a fail-safe battery. When power is restored, the system returns to Service sub-state 408 from Hibernate sub-state 412 and processes any outstanding background events. With the power restored, the auxiliary display turns back on for displaying output from auxiliary processing while the computer system is in standby mode.

While in the Service sub-state 408, the system performs background processing to monitor and service activities like incoming communications, and also notifies the user of their occurrence. Phone calls, emails, instant messages and other incoming communications, meeting reminders, system alerts, and information from Internet subscription services may all trigger a wake-up event for service while the system is in Standby state 406. An application or system service request from the auxiliary processor 12 can also be a wake-up event. As will be understood, notifications are generated by the respective application programs executed as part of the background processing performed to service these activities. These notifications are displayed on the auxiliary display to notify the user of their occurrence while the system is in Standby state 406. For example, an email program will be executed in the background to process an incoming email message received on a LAN while the system is in Standby state 406. In processing the email, the email program will send a notification that a new email has arrived. This notification will be forwarded for display on the auxiliary display to notify the user. If there are no further background tasks to process before the inactivity timer expires, the system transitions from Service sub-state 408 to Sleep sub-state 410. It should be understood that while the system is in Standby state 406, the auxiliary processor 12 may, independent of the processing unit 21, perform auxiliary processing of tasks such as recording voicemail, receiving an incoming phone call or playing music. Such auxiliary processing tasks may be requested by a user through the auxiliary input device 3.

If the user wishes to return to the fully operational system, the user may transition to the On 404 state from any sub-state of the Standby state 406 with the user context preserved. The system transitions from any sub-state of Standby state 406 to the On state 404 whenever a resume event occurs. For example, a resume event occurs whenever the user signifies the intention to return to the user session, such as by pressing the power button while in the Standby state 406. It will be appreciated by those skilled in the art that there are other ways of generating a resume event, such as opening the lid of a mobile computer. When the system transitions into the On state 404, the power management routines of the operating system turn back on the main monitor, spin the hard drives, and turn back on the system fans.

In addition to transitioning from the On state 404 to the Standby state 406 by the occurrence of a standby event already previously described, the system may also transition to the Hibernate sub-state of Standby state 406 if a power loss occurs while in On state 404. Finally, the system may transition from the On state 404 to the Off state 402 upon the occurrence of either a open-chassis event or a shutdown event. An open-chassis event occurs when the processing unit 21 chassis is opened. A shutdown event may occur whenever the user depresses the power button for several seconds. Alternatively, the user may generate a shutdown event by shutting down the system through the user interface, such as clicking the Turn Off Computer option in the Start menu of the Windows® XP operating system and then selecting the Shut Down option.

In the Off 402 state, the operating system of the computing device 20 is shut down and the user context is discarded. When the computing device 20 is in the Off 402 state, it is safe for the user to remove power and open the chassis of the computing device 20 to upgrade or repair the hardware.

It will be appreciate by those skilled in the art that the state diagram illustrated in FIG. 4 is an exemplary diagram and that the present invention may be practiced by using modifications of the state diagram such as by combining the Sleep sub-state and the Hibernate sub-state. In that case, the system would transition from the Service sub-state 408 to such a combined state upon the occurrence of either a hibernate event or a sleep event.

Figure 5:
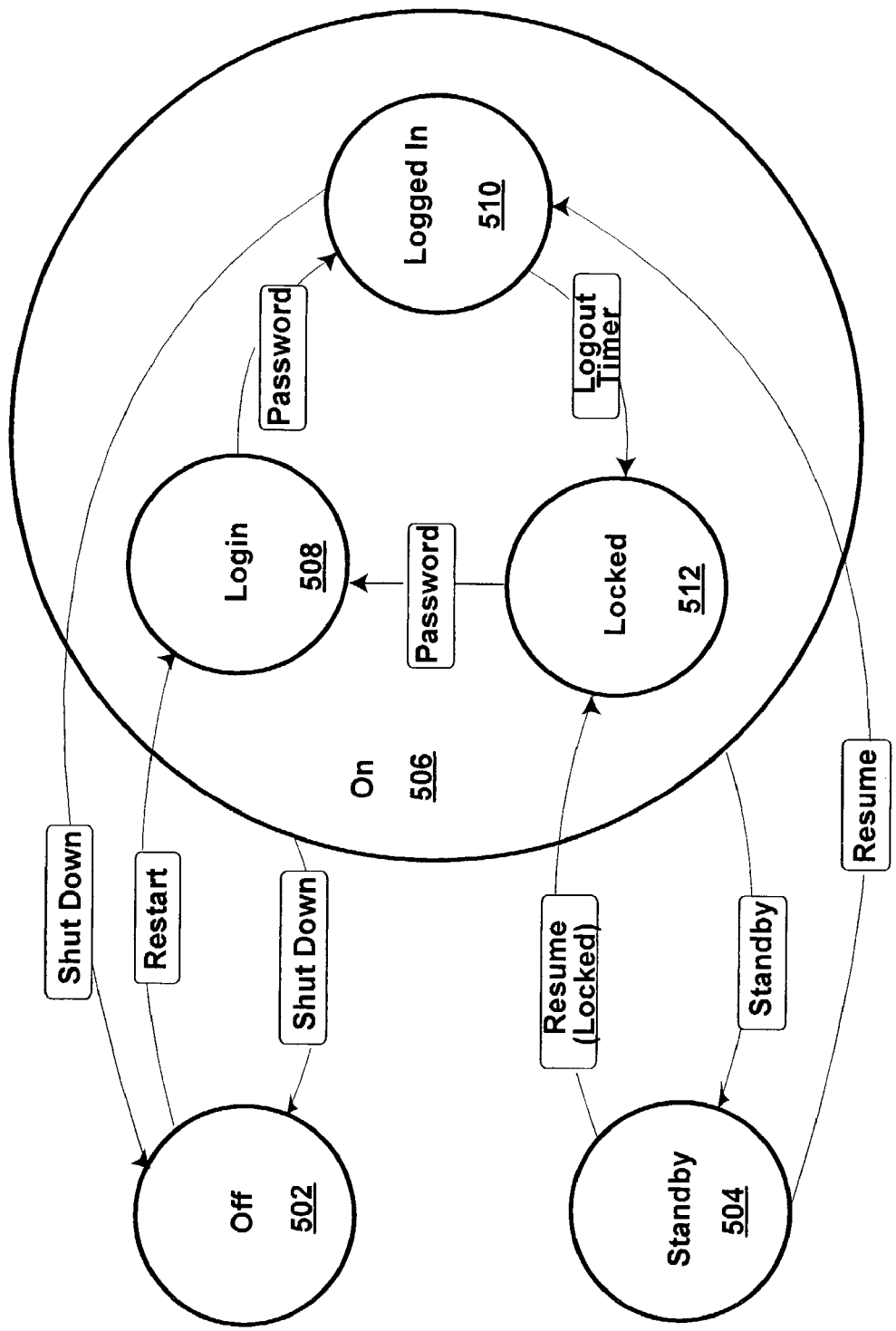
FIG. 5 is a state diagram generally illustrating the security states of a computing device for security management in accordance with an aspect of the present invention.

FIG. 5 presents a state diagram generally illustrating the security states of computing device 20 for security management of the present invention. More particularly, the state diagram illustrates three main security states for operation of auxiliary processing of information and the actions associated with the transition between the states. Corresponding to the three main power states described above, there are three main security states: Off 502, On 506 and Standby 504. Additionally, the On state 506 has three sub-states: Login 508, Logged In 510 and Locked 512. Before computing device 20 is powered on, the system is in Off state 502 with the monitor off and the auxiliary display blank. If a restart event occurs, the system transitions from the Off state 502 to the On state 506. One example of a restart event is when a user presses the power button (with the power supply switch on, if present). This powers up the system and transitions the system to the Login sub-state 508 within the On state 506 and begins the user session with a login procedure. The login procedure may use a biometric or smartcard authentication device or may alternatively use a login screen. If the login procedure is successful, the user is authenticated and the system transitions to the Logged In sub-state 510. The system is fully operational in the On state 506 with the monitor and the auxiliary display painted with their respective screens. In this state, the system manages security access to system resources and data and is fully active with the user.

If the user wishes to change the login password, the user may enter into the user interface security dialogue by pressing the system Security Button, if present, or may enter into the user interface security dialogue through the user interface, such as by choosing the User Accounts menu option from the Control Panel in the Windows® XP operating system. In one embodiment of the present invention, the user may advantageously limit the application functionality of the auxiliary processor and, additionally, what may be displayed on the auxiliary display when the user is not logged in, thereby allowing only certain non-sensitive or very specifically-controlled information to be displayed. For example, the system power status or security status may be displayed on the auxiliary display. A user may also change the expiration period of the logout timer for user inactivity in order to suitably control how long the full functionality of the auxiliary processor is available after the system enters standby mode. Those skilled in the art will appreciate that more than one logout timer may be used by the present invention. In one such embodiment, there may be a logout timer for the On power state 404 and another for the Standby power state 406. Additionally, there may be a separate timer for various auxiliary processing activities such as displaying emails or instant messages.

If the logout timer expires while in the Logged In sub-state 510, the system transitions to the Locked sub-state 512. While in the Locked sub-state 512, the functionality of the computer device 20 is unavailable through the main system interfaces except for the login procedure. The user, however, may advantageously configure the system to allow partial or full application functionality of the auxiliary processor and, additionally, allow partial or full display of content on the auxiliary display. The system remains in the Locked sub-state 512 until the user presses the Security Button, if present, or any other button which transitions the system to the Login sub-state 508 where the user may enter into the login procedure.

If a shutdown event occurs while the system is in the On state 506, the system will transition to the Off state 502 upon the occurrence of a shutdown event. A shutdown event automatically logs the user off the system. A shutdown event may occur in any of several ways such as whenever the user depresses the power button for several seconds or logs out of the system through the user interface by entering the logout procedure. The user may also enter into the security dialogue by pressing the system Security Button, if present, and then enter the logout procedure. Alternatively, the user may generate a shutdown event by shutting down the system through the user interface, such as clicking the Turn Off Computer option in the Start menu of the Windows® XP. When the system is in the Off state 502, the auxiliary processor is unavailable and the auxiliary display is blank.

The system may also transition from the On state 506 to the Standby state 504 whenever a standby event occurs. For example, a standby event occurs whenever the user signifies the intention to end the user session, such as by pressing the power button while in the On state 404. Alternatively, the user may generate a standby event by turning off the system through the user interface, such as clicking the Turn Off Computer option in the Start menu of the Windows® XP operating system. If computing device 20 is a mobile personal computer, then the user may also generate a standby event by closing the lid of the mobile computer. Yet again, the user session timer may expire due to inactivity for a period of time, and thereby generate a standby event. When the system enters Standby state 504, the power management routines of the operating system turn off the main monitor, spin down the hard drives, and shut off the system fans. However, the auxiliary display advantageously remains on for displaying output from auxiliary processing while the computer system is in standby mode. While in Standby state 504, the functionality of the auxiliary processor can be configured by the user to allow execution of selected applications such as caller ID or voicemail recording even if the logout timer expires.

Finally, the system transitions from the Standby state 504 to the On state 506 upon the occurrence of a resume event. For example, a resume event occurs whenever the user signifies the intention to return to the user session, such as by pressing the power button while in the Standby state 504. It will be appreciated by those skilled in the art that there are other ways of generating a resume event, such as opening the lid of a mobile computer. When the system transitions into the On state 404, the power management routines of the operating system turn back on the main monitor, spin the hard drives, and turn back on the system fans. If the logout timer is expired when the resume event occurs, the system transitions to Locked sub-state 512 within the On state 506. If, however, the logout timer is not expired or is not set, then the system transitions to the Logged In sub-state 510 of the On state 506 when the resume event occurs.

It will be appreciate by those skilled in the art that the security state diagram illustrated in FIG. 5 is an exemplary diagram and that the present invention may be practiced by using modifications of the security state diagram such as by combining the Login sub-state and the Locked sub-state. In that case, the system would transition to such a combined security state from the Off state 502 upon a restart event and from the Standby state 504 upon a resume-locked event.

Figure 6:
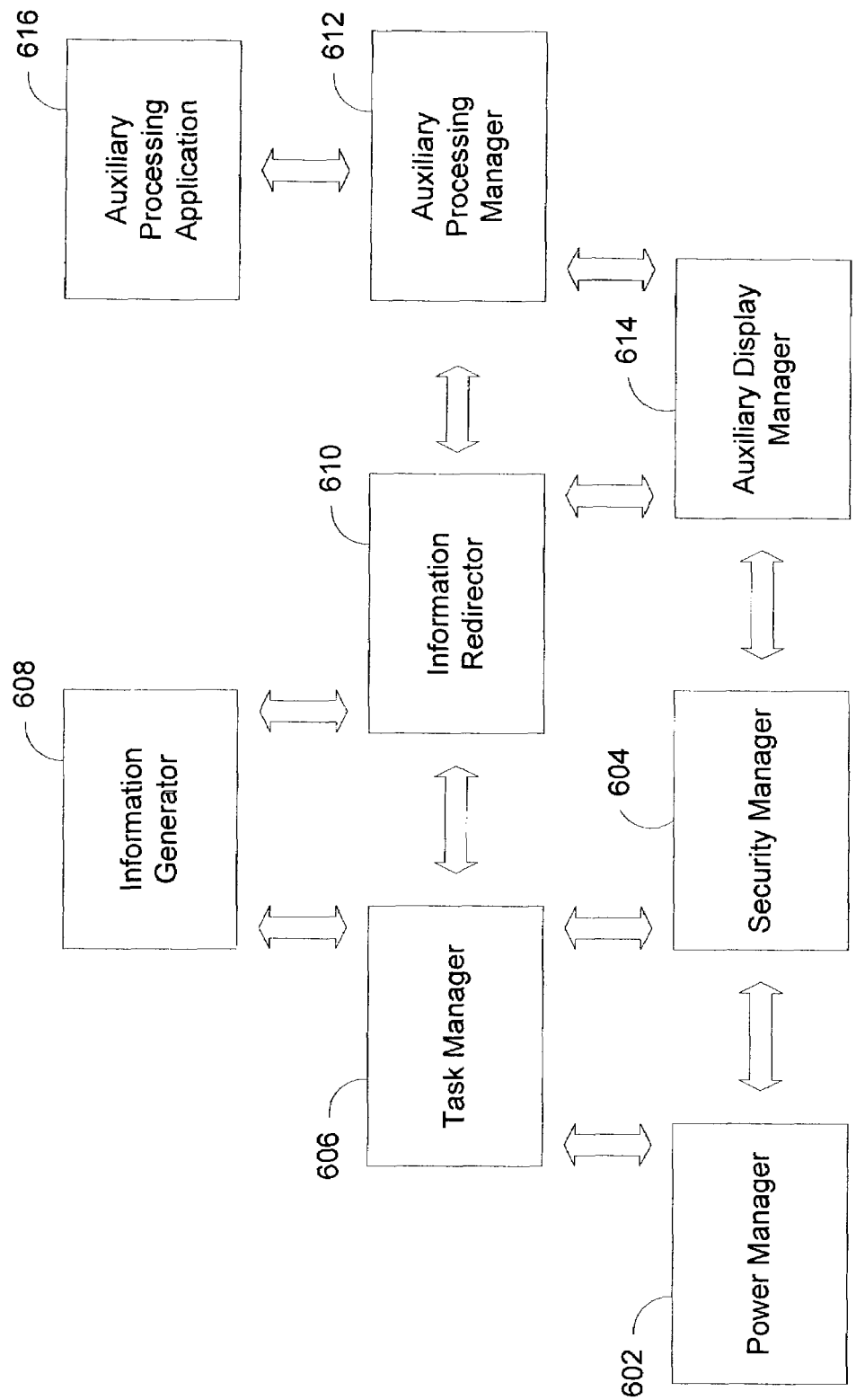
FIG. 6 is a block diagram generally representing the components of an exemplary embodiment of an auxiliary processing facility used for the auxiliary processing of information in accordance with an aspect of the present invention.

FIG. 6 presents a block diagram generally representing the components of an exemplary embodiment of an auxiliary processing facility used for the auxiliary processing of information. Those skilled in the art will appreciate that the functionality implemented within the blocks illustrated in the diagram may be implemented as separate components or the functionality of several or all of the blocks may be implemented within a single component. For example, a separate component may be implemented that contains the functionality of the auxiliary processing manager and the functionality of the auxiliary display manager.

The Power Manager 602 may be an operating subsystem or component capable of performing power management according to the power state diagram illustrated in FIG. 4. To do so, the computing device 20 may include the Advanced Configuration and Power Interface (ACPI) and power manager 602 executing on computing device 20 may use the ACPI capabilities to turn on resources as needed and manage system power states and device power states. The Power Manager 602 communicates with the Security Manager 604 to notify it of power state changes. For example, whenever there is a shutdown event that causes a power state transition from the On state 404 to the Off state 402, the Power Manager sends a message to the Security Manager to inform it of the event. The Security Manager in turn may process this event to log the user off and transition from the security On state 506 to the security Off state 502. The Power Manager 602 also communicates with the Task Manager 606 to inform it of wake-up events. For example, any incoming communications activity that occurs such as a LAN, modem or USB device activity can cause a wake-up event that transitions the power system from power sub-state Sleep 410 to power sub-state Service 408. The Power Manager sends a message to the Task Manager to inform it of the event so that the Task Manager may pass the event to the appropriate Information Generator or application program to process the incoming communication in the background while the system is in standby mode.

The Security Manager 604 may be an operating subsystem or component capable of performing security management according to the security state diagram illustrated in FIG. 5. As already noted, it is informed of power state events from the Power Manager 602. The Security Manager 604 may also communicate with the Power Manager 602 to inform it of security events like a user logging off using the logout procedure which may trigger a standby event for transitioning from the power On state 404 to the power Off state 402. The Security Manager 604 also communicates with the Auxiliary Display Manager 614 to inform it of any security restrictions configured by the user for auxiliary display of information.

The Task Manager 606 may be an operating subsystem or component capable of launching application programs to perform background processing of incoming communications activity that occurs such as a LAN, modem or USB device activity. As discussed above, it communicates with the Power Manager 602 and sends incoming communications to the appropriate Information Generator 608.

Any application program or operating system component may be an Information Generator 608 that may process incoming communications and may subsequently send information for auxiliary display or auxiliary processing. For example, communication applications like email, voicemail, telephony and instant messaging may send a notification whenever there is a new incoming communication. Information services like internet-related services or network-based communication services may send notifications of information for which the user subscribed. Personal management applications including calendar and task management programs send reminders of upcoming meetings and due dates for tasks. And operating system components provide notifications of device status, service alerts, and system health. Any information or notifications sent by these programs or components for display is sent to the Information Redirector 610 when the system is in standby mode with the main monitor turned off. When the system is on (On state 404), the Information Redirector 610 may intercept any information or notifications sent to be displayed on the main monitor and redirect them to the Auxiliary Display Manager 614.

For each information message intercepted, the Information Redirector 610 compares the source of the message and the message type against a database of messages that are to be redirected for display on the auxiliary display or forwarded for auxiliary processing. Whenever there is a match in the database, the Information Redirector send that message to the Auxiliary Display Manager 614 rather than forwarding it on for display on the main monitor.

The Auxiliary Display Manager 614 receives new notifications from the Information Redirector 610 and sends display messages to the auxiliary display 1, and receives input requests from the input device 3 for reviewing notifications. The Auxiliary Display Manager 614 also contains the configuration routines for updating the database of message sources and types that are to be displayed on the auxiliary display. Whenever the Auxiliary Display Manager receives any security restrictions configured by the user for auxiliary processing of information while the computer is in standby mode, it updates the database of messages that are to be displayed on the auxiliary display.

Those skilled in the art will appreciate that notification queue 708 is an exemplary data structure used by the Auxiliary Display Manager and that other data structures or databases may be used by the Auxiliary Display Manager 614 to manage messages received from the Information Redirector 610.

The Auxiliary Processing Manager 612 may be an operating system, operating subsystem or component that is capable of performing task management for auxiliary processing when the main processing unit is in standby mode. It may launch Auxiliary Processing Applications 616 and generate messages sent to the Auxiliary Display Manager 614.

Any application may be an Auxiliary Processing Application 616 and may be executed while the main processing unit is in standby mode. For example, telephony applications like placing or receiving a phone call, receiving or recording voicemail, displaying caller ID, and so forth may be Auxiliary Processing Applications. Furthermore, Auxiliary Processing Applications may wake up the main processing unit from standby mode to on and execute a related application. Or Auxiliary Processing Applications may execute at the same time that the main processing unit is executing an unrelated application.

Figure 7:
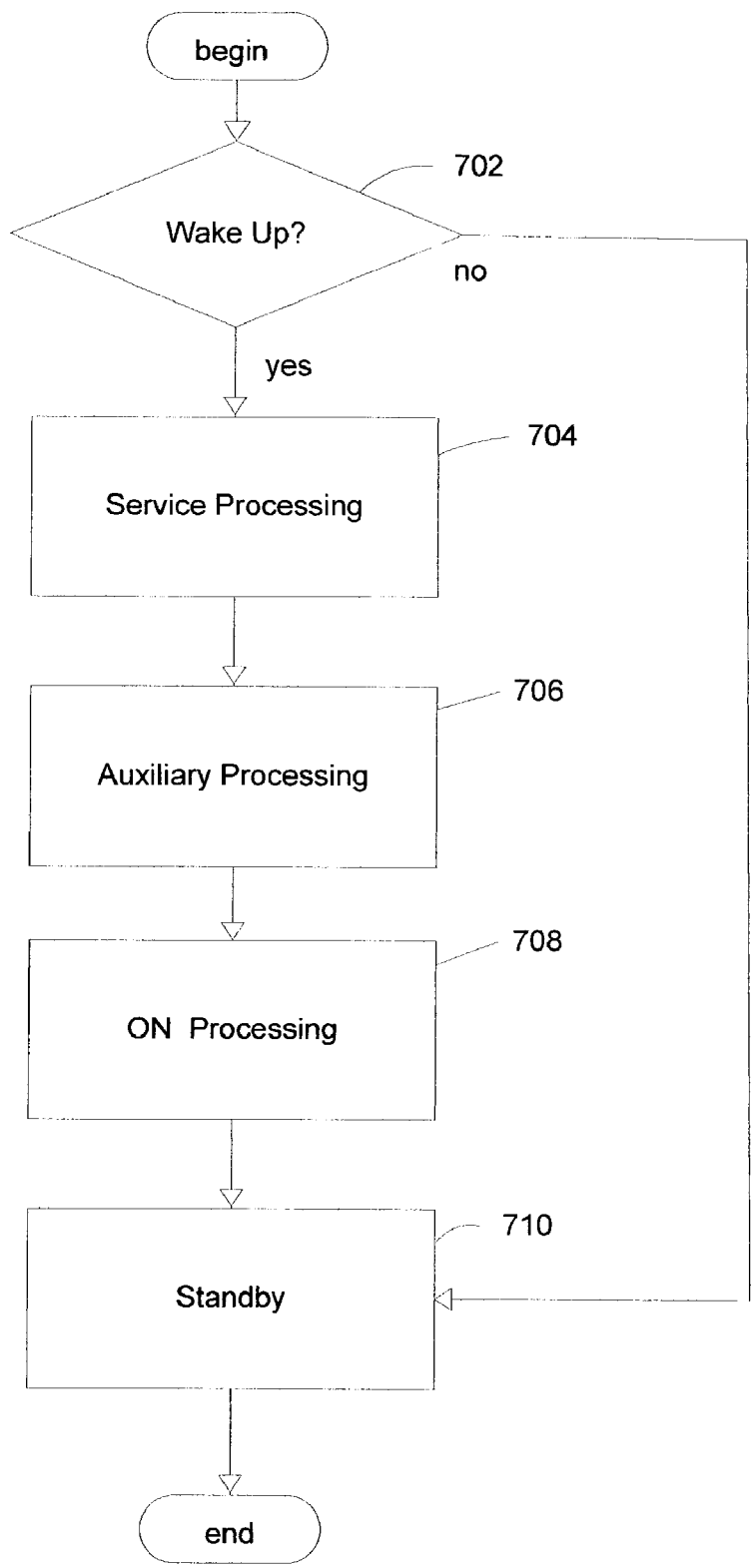
FIG. 7 is a flowchart generally representing the steps of auxiliary processing of information in a computing device in accordance with an aspect of the present invention.

FIG. 7 is a flowchart generally representing the steps of auxiliary processing of information in a computing device. In step 702, the computing device has transitioned to the standby mode after being turned on and is sleeping in standby mode waiting to be awakened. The operating system has turned off the main monitor, spun down the hard drives, and shut off the system fans. If there is no wake-up event, the computing device continues to sleep in standby mode at step 710.

When a wake-up event occurs, the computing device transitions to the service standby mode at step 704. For example, if a new email is received from the LAN, a wake-up event occurs. The Power Manager 602 transitions the system from the Sleep 410 sub-state to the Service 408 sub-state and begins service processing. The Power Manager 602 then sends a message to the Task Manager 606 to inform it of the event so that the Task Manager may pass the event to the appropriate Information Generator 608 to process the incoming communication in the background while the system is in standby mode. The email program is launched, receives the new email, and sends a notification to the Information Redirector 610 for forwarding to the Auxiliary Display Manager 614 to display the message on the auxiliary display.

Figure 8:
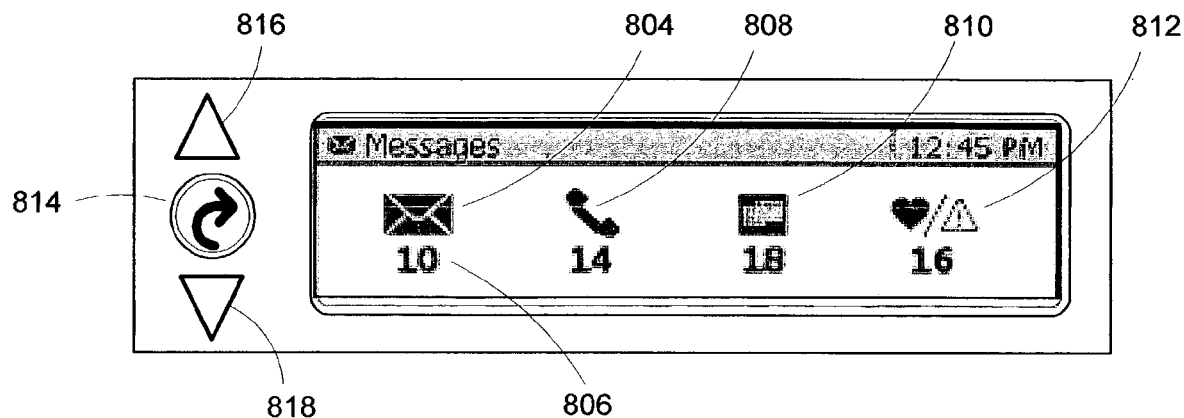
FIG. 8 is an exemplary illustration generally representing the use of an auxiliary display to present notifications in accordance with an aspect of the present invention.

At step 706, auxiliary processing occurs using the auxiliary processor 12. The Auxiliary Display Manager performs the processing steps shown in FIG. 9 to display the notification on the auxiliary display. Further auxiliary processing may occur. For instance, the user may see that there are 10 new email messages on the auxiliary display as illustrated in FIG. 8 and request a list of the email messages. The Auxiliary Display Manager then undertakes the steps described in FIG. 11 to present the list of email messages to the user. The user may view the list of emails illustrated in FIG. 10. If the user selects one of the email messages to review, then the Auxiliary Display managers sends a request to the Information Redirector 610. This generates a resume event that transitions the system from Standby to On.

At step 708, the system transitions to the On 404 state from the Standby state 406. When the system transitions into the On state 404, the power management routines of the operating system turn back on the main monitor, spin the hard drives, and turn on the system fans. The Information Redirector brings the email program to the foreground of the monitor on the computer system for the user to continue processing the email in the fully operational system. When the user is finished, the system may return to the Standby state at step 710 after a period of inactivity.

FIG. 8 presents an exemplary illustration generally representing one embodiment of an auxiliary display. The information display area includes icons, such as the envelope icon 804 for email messages, for each category of information configured for alerting a user of notifications or messages sent by an application or system component. Beneath each icon is a tally of the total number of notifications received for that information category. Tally 806 displayed underneath the email icon 804 indicates that ten email messages have received. The other icons illustrated in FIG. 8 that represent additional information categories are phone call notifications 808, calendar notifications 810 and system status notifications 812.

The auxiliary display may have an input device associated with it, like switch button 814 in FIG. 8, that allows the user to switch between different categories of information such as email messages 804, phone call notifications 808, calendar notifications 810, and system status notifications 812. Accompanying the switch button may be additional buttons for controlling the output of the auxiliary display. FIG. 8 llustrates an up button 816 and a down button 818. Once selected, a user can press switch button 814 to move the application associated with that information category to the foreground on the monitor of the computer to read the message(s). If the application is not running on the computer in the background, then pressing the switch button 814 launches that application.

If the particular embodiment of the auxiliary display only has the single switch button 814, then the auxiliary display may automatically scroll through the information categories from left to right (or from right to left), pausing periodically on a particular information category. The user may then press the switch button 814 to move the application program to the foreground on the monitor of the computer to read the message(s).

In yet another exemplary embodiment, pressing switch button 814 after an information category has been selected results in displaying more detail about the messages received for that information category on the auxiliary display. For example, a user may scroll across the information categories displayed in FIG. 8 by using up button 816 to select an information category such as email messages 804. Once selected, a user can press switch button 814 to display a list of email messages received.

Figure 9:
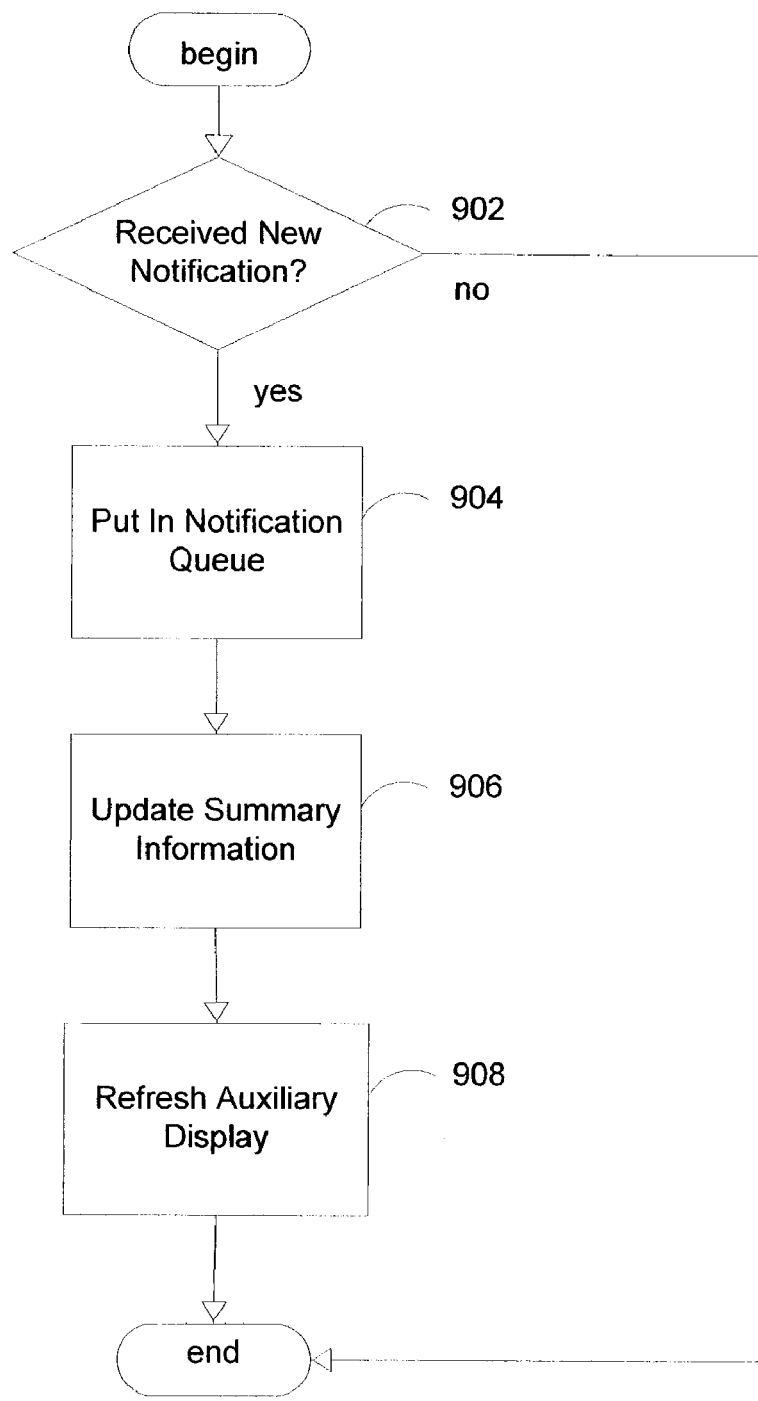
FIG. 9 is a flowchart generally representing the steps undertaken for auxiliary display of a new notification in accordance with an aspect of the present invention.

FIG. 9 is a flowchart generally representing the steps undertaken by the Auxiliary Display Manager for auxiliary display of a new notification. First, the Auxiliary Display Manager checks if it has received a new notification message at step 902. If it has not, then it is finished processing. However, if it received a new notification message, then it puts the new notification message in the notification queue at step 904.

To put the new notification in the notification queue at step 904, the Auxiliary Display Manager checks the message type and message priority to determine the priority of the message. For a high priority message, the Auxiliary Display Manager inserts the message at the head of the queue. For a normal priority message, the auxiliary display manager inserts the message after the highest priority message that has not yet been displayed in the queue. Although there are other ways to insert messages in the queue as is appreciate by those skilled in the art, this method places the highest priority messages to be displayed at the head of the queue.

Once the new notification has been put in the notification queue, the Auxiliary Display Manager updates the summary information at step 906. To update the summary information, the auxiliary display manager increments the tally for the information category of the new notification received by one. After the summary information has been updated, the Auxiliary Display Manager refreshes the auxiliary display at step 908.

Figure 10:
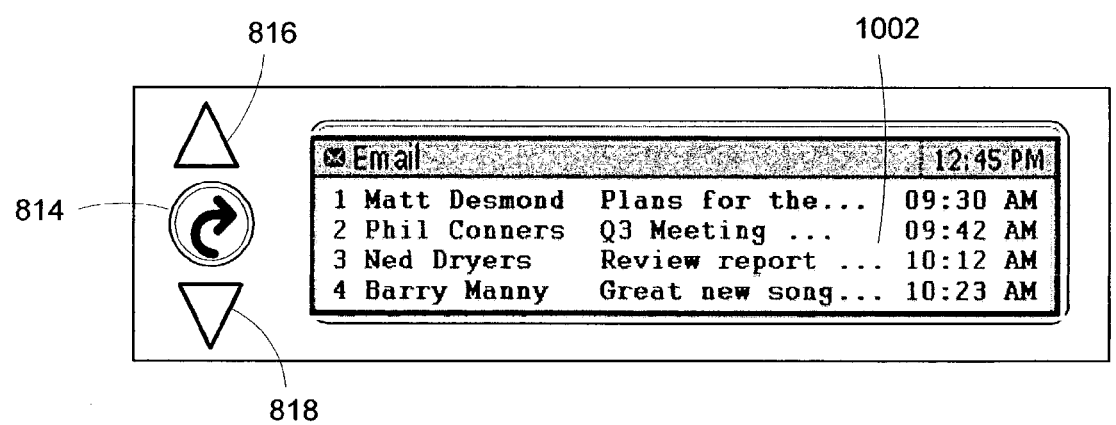
FIG. 10 is an exemplary illustration generally representing the use of the auxiliary display to show a list of detailed information in accordance with an aspect of the present invention.

FIG. 10 presents an exemplary illustration generally representing the use of the auxiliary display to show a list of detailed information. More particularly, FIG. 10 illustrates the use of the auxiliary display to present more detail about the messages received in an information category, and specifically shows additional details about the email messages received. After a user has selected email messages 804 and pressed the switch button 814, the information display area 1002 is updated to present more detail about the email messages received and lists the first four emails received along with the name of the sender, the first few words of the subject and the time the email was sent.

By pressing the down button 818, the user may view additional email messages. The user may use either the down button 818 or the up button 816 to scroll through the email messages and to select a particular message. Once selected, a user can press switch button 814 to move the application associated with that information category to the foreground on the monitor of the computer to read the message(s). If the application is not running on the computer in the background, then pressing the switch button 814 launches that application.

If the particular embodiment of the auxiliary display only has the single switch button 814, then the auxiliary display may automatically scroll through the email messages in display area 1002 from top to botton, pausing periodically on a particular email message. The user may then press the switch button 814 to move the application program to the foreground on the monitor of the computer to read the message.

Figure 11:
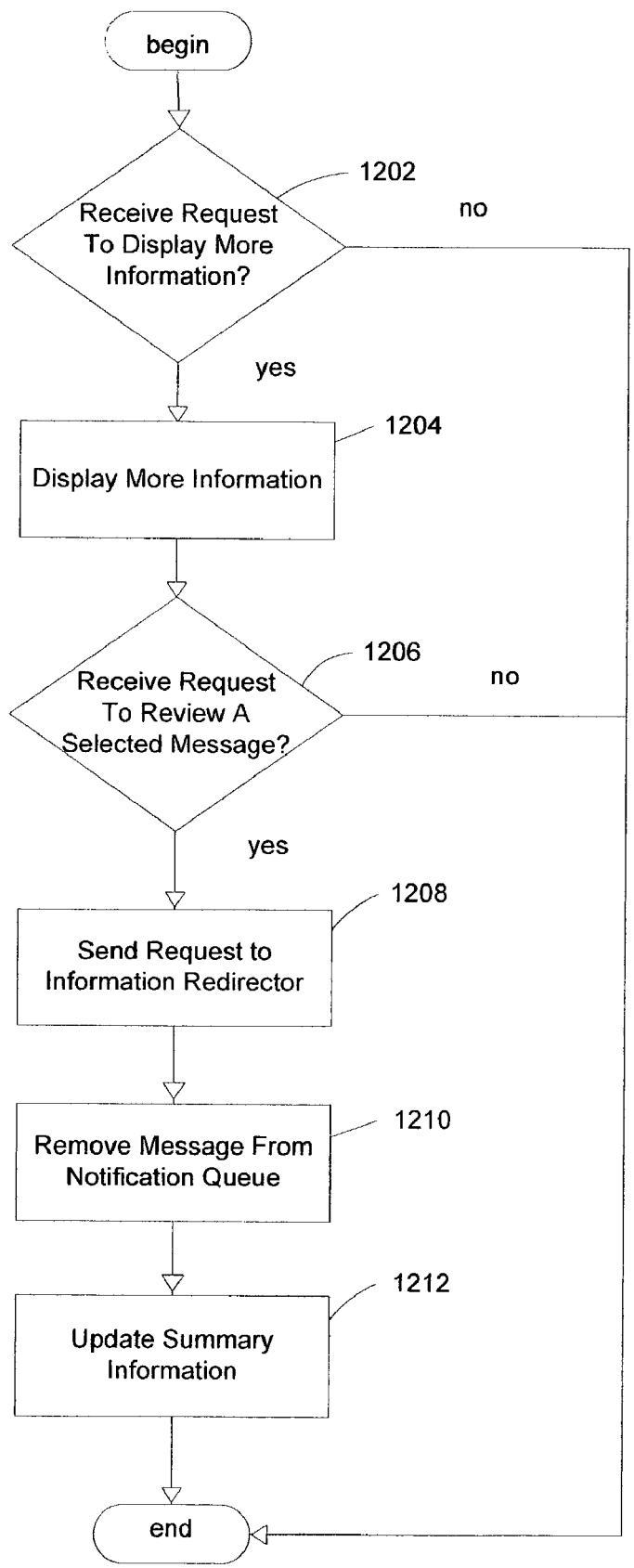
FIG. 11 is a flowchart generally representing the steps for providing more detailed information about displayed messages in accordance with an aspect of the present invention.

FIG. 11 is a flowchart generally representing the steps undertaken by the Auxiliary Display Manager upon receiving a request to provide more detailed information about displayed messages. As previously discussed, a user may request to receive more detailed information about messages or to review a selected message by using an input device controlling the output of the auxiliary display. First the auxiliary display manager checks if it has received any request to display more detailed information such as a message list at step 1102. If not, then it finishes processing. However, if it has received a request to display more detailed information, then it displays more detailed information such as the message list at step 1104. As will be appreciated, the user may scroll forward and backward through the detailed information such as a message list to view additional messages using the input device controlling the output of the auxiliary display.

Next the auxiliary display manager checks if it has received a request to review a selected message at step 1106. If not, then it finishes processing. However, if it has received a request to review a selected message, then it sends a request to the Information Redirector 608 at step 1108. The information redirector brings the Information Generator 608 that originated the notification to the foreground of the monitor on the computer system and forwards the request to the Information Generator so that it may display the information or message that generated the notification on the main monitor. As discussed previously, if the information generator is not executing in the background on the computer system, then the Information Redirector makes a request to launch the Information Generator to execute in the foreground on the monitor and then forwards the user's request to review the selected message.

At step 1110, the Auxiliary Display Manager removes the message which was selected at step 1108 from the notification queue. Then, the Auxiliary Display Manager updates the summary information by decrementing the tally for the information category of the selected message by one. After the summary information has been updated, the Auxiliary Display Manager is finished.

Those skilled in the art will appreciate that messages which remain unread in the notification queue may be automatically removed after a specific time period in another exemplary embodiment. Furthermore, it will be appreciated the time period may be configurable for each message type.

Although the present invention was described using the example of incoming email for illustrating auxiliary processing, note that the auxiliary processor may operate independently of the main processor and may operate when the main processor is powered down or otherwise occupied. Those skilled in the art will appreciate that the system described for auxiliary processing of information is a general purpose system that is extensible with a programmable interface for execution of applications by the auxiliary processor alone or in concert with the main processor. The auxiliary processor may be its own computing device. It may have its own separate input/output subsystem or share the input/output system used by the main processor.

As is now understood, activities such as answering phone calls, handling voice mail, displaying new e-mail, record voice messages, browsing the Internet, downloading data, recording TV shows and so forth occur without the user having to turn on the computer, or when the main processor is performing some other task. For example, the user may use a telephone handset and speakerphone connected to the computer system as conventional appliances when the computer system is powered down, and use the auxiliary display as a caller-ID device. As another example, the user may be reading email with the computer system powered on and use the auxiliary processor to answer the phone. Any number of applications can be handled by the auxiliary processor. The combination of the auxiliary processor and the Standby state effectively transforms the computer to be more available and usable like a consumer appliance.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computerized environment that includes a main processor, an auxiliary processor, a main display, and an auxiliary display each coupled to the same computing system, a system configured for auxiliary processing of information while the main processor is in one or more standby states, the system comprising:

a computing device housing a main processor for processing information, the computing device having power states comprising off, on, and a plurality of standby states;

a task manager enabled to perform background processing of incoming communications;

a power manager, the power manager enabled to manage system power states and device power states and is further enabled to communicate with the task manager to inform it of wake-up events; and an auxiliary processor, the auxiliary processor configured so that, when the computing device, including the main processor, is powered down into a standby state of operation by the power manager, the auxiliary processor processes at least some of the information directed from an outside source to the main processor.

2. The system of claim 1 further comprising an auxiliary display coupled to the computing device, the auxiliary display controlled by the auxiliary processor to output representations corresponding to data received from the computing device using at least one member of a set consisting of visual, audible, and tactile representations.

3. The system of claim 1 further comprising an auxiliary display coupled to the auxiliary processor, the auxiliary display controlled by the auxiliary processor to output representations corresponding to data received from the computing device using at least one member of a set consisting of visual, audible, and tactile representations.

4. The system of claim 1 wherein a main display coupled to the computing device is turned off when the computing device and main processor are powered down into a standby state of operation; and, during the standby state of operation, an auxiliary display coupled to the computing device provides display output of data that would otherwise be displayed through the main display.

5. The system of claim 1 wherein a fan coupled to the computing device is turned off when the computing device is powered down into a standby state of operation.

6. The system of claim 1 wherein any disk drives not accessed by the auxiliary processor are spun down when the computing device is powered down into a standby state of operation.

7. The system of claim 1 further comprising an input device coupled to the auxiliary processor for controlling output to an auxiliary display.

8. The system of claim 1 further comprising an input device coupled to the auxiliary processor for inputting user commands for execution of applications.

9. The system of claim 8 wherein the execution of the applications is performed by the auxiliary processor.

10. The system of claim 8 wherein the execution of at least one of the applications is partially performed by the auxiliary processor and partially performed by a main processor of the computing device.

11. The system of claim 1 further comprising an input device coupled to a main processor for receiving input for the main processor and for the auxiliary processor.

12. The system of claim 1 wherein the auxiliary processor is integrated within the main processor of the computing device.

13. The system of claim 1 wherein the auxiliary processor performs auxiliary processing of information received from the computing device.

14. The system of claim 1 wherein the auxiliary processor performs auxiliary processing of information received from an input device coupled to the auxiliary processor.

15. The system recited in claim 1, wherein the plurality of standby states include at least one of service, sleep or hibernate.

16. In a computerized environment that includes a main processor, an auxiliary processor, a main display, and an auxiliary display each attached to or housed within the same computing system, a system configured for auxiliary processing of information through an auxiliary processor while the computing system and main processor are in one or more standby sub-states, the system comprising:

means for processing information in a computing device at least in part through main processor housed within, the computing device having power states comprising off, on, and a plurality of standby states;

means for performing background processing of incoming communications;

means for controlling the power states of the computing device including the standby power state of operation, said means for controlling the power states comprising a power manager that is enabled to manage system power states and device power states and that is further enabled to communicate with a task manager to inform the task manager of wake-up events; and means for performing auxiliary processing of the information, at least in part through an auxiliary processor , when the computing device is powered down to the standby state of operation, the auxiliary processing means further operable to process data directed from a remote source to the computing device when the computing device, including the main processor, is in a standby state.

17. The system as recited in claim 16, wherein the auxiliary processor is integrated within the main processor of the computing device.

18. The system as recited in claim 16, wherein the auxiliary processor of the computing device displays information through an auxiliary display regarding internet communication even through the main processor is in a standby state and a main display is powered down.

19. The system recited in claim 16, wherein the plurality of standby states include at least one of service, sleep or hibernate.

* * * * *